United States Patent
Yim et al.

(10) Patent No.: US 8,451,045 B2
(45) Date of Patent: May 28, 2013

(54) INVERTER CONTROL SYSTEM

(75) Inventors: Jeongbin Yim, Gyeonggi-do (KR); Daewoong Han, Gyeonggi-do (KR); Gu Bae Kang, Gyeonggi-do (KR); Byungsoon Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 360 days.

(21) Appl. No.: 12/961,267

(22) Filed: Dec. 6, 2010

(65) Prior Publication Data

US 2012/0069618 A1   Mar. 22, 2012

(30) Foreign Application Priority Data

Sep. 17, 2010   (KR) .................. 10-2010-0092054

(51) Int. Cl.
*H03K 17/28* (2006.01)
(52) U.S. Cl.
USPC .......................................... 327/392; 327/434
(58) Field of Classification Search
USPC ................ 327/108, 110–112, 375, 379, 394, 327/427, 434, 377, 376; 363/34–39, 46, 56.05, 363/98
See application file for complete search history.

(56) References Cited

U.S. PATENT DOCUMENTS

| | | | |
|---|---|---|---|
| 6,057,728 A * | 5/2000 | Igarashi | 327/546 |
| 6,094,087 A * | 7/2000 | He et al. | 327/434 |
| 6,229,356 B1 * | 5/2001 | Miettinen | 327/108 |
| 6,906,574 B2 * | 6/2005 | Ohi et al. | 327/392 |
| 7,948,277 B2 * | 5/2011 | Nakatake et al. | 327/109 |

FOREIGN PATENT DOCUMENTS

| | | |
|---|---|---|
| JP | 2004-048959 A | 2/2004 |
| JP | 2008-054098 A | 3/2008 |
| JP | 2010-022190 A | 1/2010 |

* cited by examiner

*Primary Examiner* — Rajnikant Patel
(74) *Attorney, Agent, or Firm* — Edwards Wildman Palmer LLP; Peter F. Corless; Kongsik Kim (57) ABSTRACT

An inverter control apparatus is provided that offers a 'soft turn off' to a gate operation of the inverter so as to securely protect the IGBT. In particular, an inverter control system according to the present invention may include a gate operating portion that controls turn on/off of an IGBT and forcibly turns off the IGBT if a short circuit or an over current is detected from the IGBT, a current buffer that amplifies a control current for the turn on/off of the IGBT that is outputted from the gate operating portion, and a filter that delays the forcible turn off control current that is outputted from the gate operating portion.

15 Claims, 8 Drawing Sheets

INVERTER CONTROL SYSTEM

CROSS-REFERENCE TO RELATED APPLICATION

This application claims priority to and the benefit of Korean Patent Application No. 10-2010-0092054 filed in the Korean Intellectual Property Office on Sep. 17, 2010, the entire contents of which are incorporated herein by reference.

BACKGROUND OF THE INVENTION (a) Field of the Invention

The present invention generally relates to an inverter control apparatus. More particularly, the present invention relates to an inverter control apparatus that offers a soft turn-off to a gate operation of an inverter to securely protect an IGBT.

(b) Description of the Related Art

Figure 1:
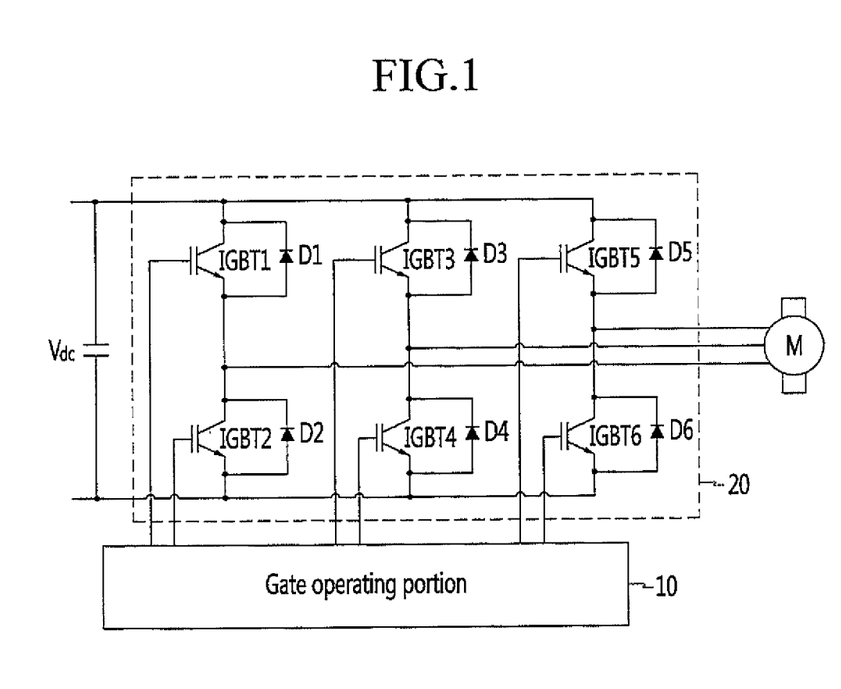
FIG. 1 shows generally a portion of a power system of an electric vehicle.

FIG. 1 shows generally a portion of a power system of an electric vehicle.

As shown in FIG. 1, the power system includes a gate operating portion 10, an inverter 20, and a motor (M).

The gate operating portion 10 outputs a PMW signal to an inverter 20, depending on a driving demand, to control speed/torque of the motor (M). As shown, the inverter 20 has a plurality of IGBT(Insulated Gate Bipolar Transistor). The inverter 20 transforms high voltage DC power supplied from a DC link (Vdc) by switching the IGBT per each phase to 3 phase AC power according to a PWM signal transferred from the gate operating portion 10. The 3 phase AC power is supplied to each phase of the motor (M). The motor (M) is, thus, driven by the 3 phase power supplied from the inverter 20 through a power cable to output a rotation speed/torque.

While FIG. 1 illustrates an electric vehicle in particular, the inverter and the motor can also be applied to an electric vehicle, a hybrid vehicle, and a fuel cell vehicle.

In a vehicle in which the inverter and the motor are provided, the inverter 3 phase power can generate a short circuit as a result of a collision, poor maintenance, deterioration of a power cable, and an error made in the assembly process.

If a short circuit is generated in the inverter 3 phase output, over current forms in the IGBT, and the gate operating portion 10 detects over current so as to prevent a damage of the IGBT by the over current and forcibly stops switching (forcible turn-off).

However, if over current is formed in the IGBT, a sharp switching off induces excessive voltage (voltage over shoot) at both ends of the IGBT. If the excessive voltage is larger than a predetermined voltage for the IGBT, the IGBT can be damaged.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an inverter control system having advantages of reinforcing a soft turn-off function during operation of an inverter such that over current is not formed at both ends of an IGBT, to thereby securely protect the IGBT.

The present invention also provides an inverter control system having advantages of being able to use voltage of a high DC link in a condition that the maximum (rated) voltage of the IGBT is unchanged.

An inverter control system according to an exemplary embodiment of the present invention may include a gate operating portion that controls turn on/off of an IGBT, and forcibly turns off the IGBT if a short circuit or an over current is detected from the IGBT; a current buffer that amplifies a control current for the turn on/off of the IGBT that is outputted from the gate operating portion; and a filter that delays the forcible turn off control current that is outputted from the gate operating portion.

In accordance with various embodiments, the current buffer may include a first transistor having a base terminal, a collector terminal, and an emitter terminal. In particular, the base terminal may be in connection with to an output of the filter, the collector terminal may be in connection with a power source, and the emitter terminal may be in connection with a gate terminal of the IGBT. The current buffer may also include a second transistor having a base terminal, a collector terminal, and an emitter terminal. The base terminal of the second transistor may be in connection with an output of the filter, the emitter terminal may be in connection with a gate terminal of the IGBT, and the collector terminal may be in connection with a ground. According to certain embodiments, a voltage dividing resistance stabilizes control current amplified according to the 'on/off' state of the first transistor and the second transistor to securely operated the IGBT.

In various embodiments, the filter includes an RC filter to which a capacitor and a resistor are coupled in parallel. If the IGBT is considered normal, then the filter may be configured to not delay the on/off response speed. In some embodiments, the filter may delay a forcible turn-off control current of the IGBT outputted from the gate operating portion to delay a turn on time of a second transistor forming the current buffer.

In some embodiments, an inverter control system of the present invention may include a gate operating portion that controls turn on/off of the IGBT and that turns off the IGBT if a short circuit or over current is detected from the IGBT. The inverter control system may further include a current buffer that amplifies turn on/off control current of the IGBT outputted from the gate operating portion, and a filter resistance that forms a separate line for directly supplying a forcible turn-off control current of the IGBT outputted from the gate operating portion with a gate terminal of the IGBT such that the forcible turn-off control current of the IGBT is not supplied to the current buffer.

In certain embodiments, the filter resistance may prevent the forcible turn-off control current outputted from the gate operating portion from amplification in the current buffer.

In various embodiments, the filter resistance may be in connection with a base terminal and an emitter terminal of the first transistor and the second transistor forming the current buffer.

In some embodiments, the filter resistance may have a characteristic of $(I_{flt} \times R_{flt}) < VQ\_on$ and $(IQ \times Rflt) > VQ\_on$. In this case, the Iflt is a forcible turn-off control current of the IGBT, the Rflt is a filter resistance value, the $VQ\_on$ is a minimum voltage for turning on the first transistor and the second transistor of the current buffer, and the $I_o$ is a control current for operating turn on/off of the IGBT in a normal IGBT condition.

In some aspects, the gate operating portion may output a turn on/off control current $(I_o)$ higher than a forcible turn-off control current $(I_{flt})$ in a normal condition of the IGBT such that a voltage $(I_o \times R_{flt})$ applied to the filter resistance becomes higher than a minimum voltage $(VQ\_on)$ for turning on the first transistor and the second transistor of the current buffer.

In some aspects, the gate operating portion may output a forcible turn-off control current $(I_{flt})$ of the IGBT lower than a normal control current ($I_o$) in a transient condition of the IGBT such that a voltage ($I_o \times R_{flt}$) applied to the filter resistance becomes lower than a minimum voltage (VQ_on) for turning on the second transistor of the current buffer.

According to an embodiment of the present invention, an inverter control system may include a gate operating portion that controls a turn on/off of an IGBT and that forcibly turns off the IGBT if a short circuit or over current is detected from the IGBT; a first transistor and a second transistor that are switched according to an on/off control current outputted from the gate operating portion to amplify a control current supplied to a gate terminal of the IGBT; and a filter resistance in connection with a base terminal and an emitter terminal of the first transistor and the second transistor to form a separate line through which a forcible turn-off control current of the IGBT is directly transferred to a gate of the IGBT, such that a forcible turn-off control current of the IGBT cannot be supplied to a base of the first transistor and the second transistor.

According to an embodiment of the present invention, an inverter control system may include a gate operating portion that controls a turn on/off of an IGBT and that turns off the IGBT forcibly if a short circuit or over current is detected from the IGBT; a first transistor and a second transistor that are switched according to an on/off control current outputted from the gate operating portion to amplify a control current supplied to a gate terminal of the IGBT; a first resistance that is in connection with a base terminal of the first transistor to adjust a switching slope; a second resistance that is in connection with a base terminal of the second transistor to adjust a switching slope; and a third resistance that is coupled with the second resistance in series, and is in connection with a base terminal and an emitter terminal of the second transistor to form a separate line through which the forcible turn-off control current of the IGBT is directly supplied to a gate of the IGBT such that the forcible turn-off control current of the IGBT is not supplied to a base of the second transistor.

The third resistance may have a characteristic of ($I_{flt} \times R_{flt}$) <VQ_on and ($I_o \times R_{flt}$)>VQ_on. In this case, $I_{flt}$ is a forcible turn-off control current of the IGBT, $R_{flt}$ is a filter resistance value, VQ_on is a minimum voltage for turning on the first transistor and the second transistor of the current buffer, and $I_o$ is a control current for turning on/off the IGBT in a normal condition of the IGBT.

The gate operating portion may output a turn on/off control current ($I_o$) high than the forcible turn-off control current ($I_{flt}$) in a normal condition of the IGBT such that a voltage ($I_o \times R_{flt}$) applied to the third resistance becomes higher than a minimum voltage (VQ_on) for turning on the first transistor and the second transistor of the current buffer.

The gate operating portion may output a forcible turn-off control current for the IGBT ($I_{flt}$) lower than a normal control current($I_o$) in a transient condition of the IGBT such that a voltage ($I_o \times R_{flt}$) applied to the third resistance becomes lower than a minimum voltage (VQ_on) for turning on the second transistor of the current buffer.

According to an embodiment of the present invention, a soft turn off function can be simply reinforced by manual elements during gate operation of the inverter such that excessive voltage at both ends of the IGBT can be effectively suppressed, and the IGBT can be reliably protected.

Also, according to the present invention, the reliability of the inverter is improved, and in a condition that the rated voltage of the IGBT is not changed, components can be commonly used, productivity is improved, and cost is reduced such that the price competitiveness is improved.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g, fuels derived from resources other than petroleum). As referred to herein, a hybrid vehicle is a vehicle that has two or more sources of power, for example both gasoline-powered and electric-powered vehicles.

DETAILED DESCRIPTION OF THE EMBODIMENTS

Hereinafter, in the following detailed description, only certain exemplary embodiments of the present invention have been shown and described, simply by way of illustration.

As those skilled in the art would realize, the described embodiments may be modified in various different ways, all without departing from the spirit or scope of the present invention, and the drawings and description are to be regarded as illustrative in nature and not restrictive.

(A First Exemplary Embodiment)

Figure 2:
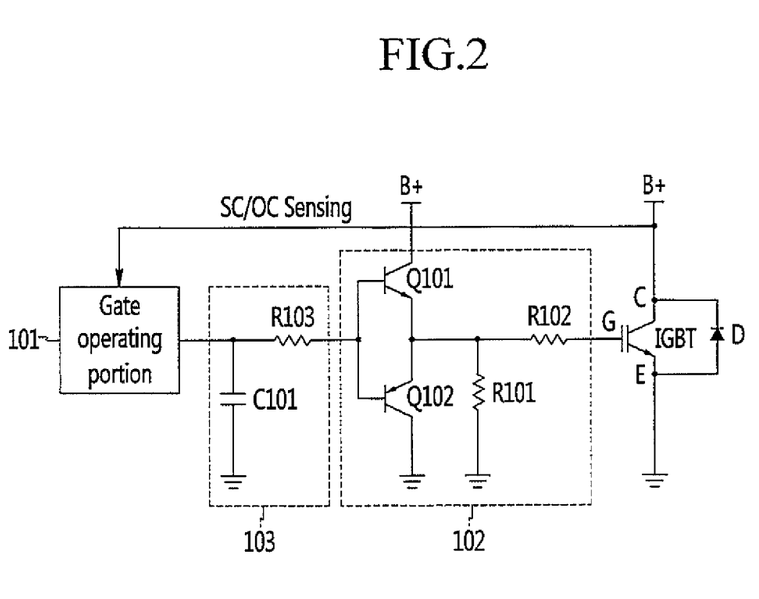
FIG. 2 shows an inverter operating device according to a first exemplary embodiment of the present invention.

FIG. 2 shows an inverter operating device according to a first exemplary embodiment of the present invention.

Referring to FIG. 2, an inverter operating device according to a first exemplary embodiment of the present invention includes a gate operating portion 101, a current buffer 102, and a filter 103.

The gate operating portion 101 can be configured to control a turn on/off of an IGBT, detect a short circuit and a over current of the IGBT, and forcibly turn off the IGBT if a short circuit or over current is detected from the IGBT.

A current buffer 102 is configured to amplify a control current outputted from the gate operating portion 101 and to supply operating current to a gate of the IGBT.

As shown in FIG. 2, the current buffer 102 can include a NPN type first transistor Q101, a PNP type second transistor Q102, and a voltage dividing resistance R101 and R102.

In the first transistor Q101, a base terminal is in connection with an on/off signal outputted from the gate operating portion 101, a collector terminal is in connection with a power source (B+), and an emitter terminal is in connection with a gate terminal of the IGBT.

In the second transistor Q102, a base terminal is in connection with an on/off signal outputted from the gate operating portion 101, an emitter terminal is in connection with a gate terminal of the IGBT, and a collector terminal is grounded.

The first transistor Q101 and the second transistor Q102 can be configured to execute operations corresponding to on/off control current transferred to a base terminal outputted from the gate operating portion 101 to turn on/off the IGBT.

The voltage dividing resistance R101 and R102 stabilize voltage of a control current that is outputted according to the on/off condition of the first transistor Q101 and the second transistor Q102 to be supplied to a gate terminal of the IGBT such that the IGBT is securely operated.

As shown, the filter 103 is disposed between the gate operating portion 101 and current buffer 102 and is configured to delay a forcible turn-off control current outputted from the gate operating portion 101 according to a short circuit or over current of the IGBT, such that the a soft turn-off of the IGBT is sustained longer.

The filter 103 can includes an RC filter that a capacitor C101 and a resistance R103 are coupled in parallel, and the delay characteristic can be minimized so as to not affect an on/off response speed of the IGBT and to reinforce a protection operation in a normal operation condition.

In particular, the filter 103 can delay a control current outputted from the gate operating portion 101 for a predetermined time so as to maintain an 'on' condition of the second transistor Q102 of the current buffer 102.

Accordingly, a turning-off time becomes longer to perform a soft turn-off.

The present invention including the functions of the inverter operating device according to the first exemplary embodiment as described above may be executed as follows.

First, it is determined whether a short circuit or over current is detected, and if they are not detected, it is determined that the operation is normal, and the normal operation is as follows.

If a control current is outputted from the gate operation portion 101 for turning on the IGBT, a NPN type first transistor Q101 forming the current buffer 102 is turned on.

A control current is amplified by a power source (B+) supplied to a collector terminal according to a 'turning on' of the first transistor Q101 and the amplified control current is supplied to a gate terminal of the IGBT as a gate current to turn on the IGBT.

In this case, a PNP type second transistor Q102 forming the current buffer 102 sustains its turn-off condition.

Also, if a control current is outputted from the gate operating portion 101 to turn off the IGBT, the NPN type first transistor Q101 is turned off and the NPN type second transistor Q102 is turned on.

A gate control current supplied to a gate terminal of the IGBT according to a 'turn on' of the second transistor Q102 is transferred to a ground through an emitter terminal of the second transistor Q102 such that the IGBT is turned off.

As described above, while the IGBT is being turned on/off according to a control of the gate operation portion 101, the gate operating portion 101 detects whether a short circuit or over current is formed or not from the IGBT.

If the short circuit or the over current is detected, the gate operating portion 101 outputs a control current so as to forcibly turn off the IGBT.

The control current outputted from the gate operating portion 101 so as to turn off the IGBT as described above is supplied to the current buffer 102 through the filter 103.

In this case, the first transistor Q101 forming the current buffer 102 is slowly turned off by a charging operation of the capacitor C101 forming the filter 103.

Accordingly, the IGBT is also slowly turned off such that the formation of excessive voltage at both ends of the IGBT is prevented.

Also, a voltage charged in the capacitor Q101 forming the filter 103 is supplied to the current buffer 102 according to a predetermined value of the resistance R103.

Accordingly, the turning off time of the first transistor Q101 forming the current buffer 102 is delayed and the turning on time of the second transistor Q102 is delayed thereby such that the turning off time of the IGBT is lengthened.

Therefore, if the IGBT is forcibly turned off according to a short circuit or over current thereof, the IGBT is slowly turned off, (i.e. the IGBT performs a soft turn off).

As described above, in the first exemplary embodiment according to the present invention, when the inverter operating device is forcibly turned off, a soft turn off is performed to prevent excessive voltage such that the damage of the IGBT is prevented and the reliability of the inverter is improved.

Also, a margin between an over shoot voltage and a rated voltage of the IGBT can be secured such that the cost is reduced and the productivity is improved through a common usage of the IGBT.

(A Second Exemplary Embodiment)

Figure 3:
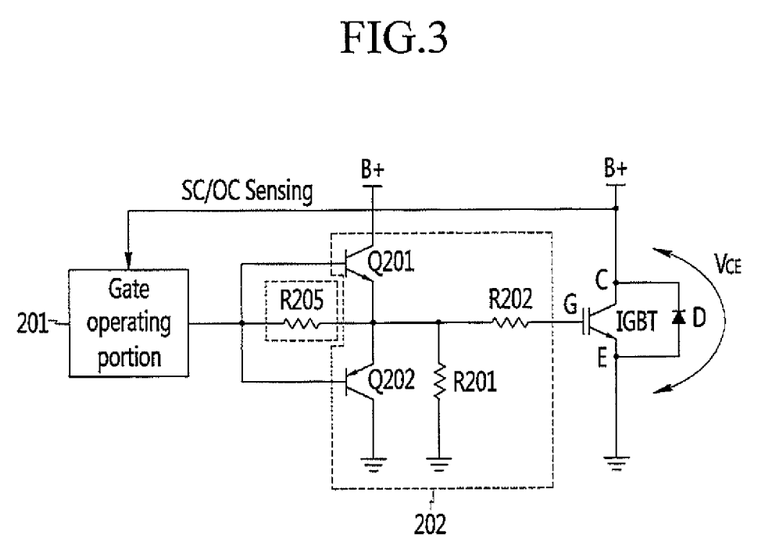
FIG. 3 shows an inverter operating device according to a second exemplary embodiment of the present invention.

FIG. 3 shows an inverter operating device according to a second exemplary embodiment of the present invention.

Referring to FIG. 3, the inverter operating device includes a gate operating portion 201, a current buffer 202, and a filter resistance R205.

The gate operating portion 201 is configured to control the ON/OFF state of the IGBT, to detect a short circuit and over current of the IGBT, and to forcibly turn off the IGBT is a short circuit or over current is detected.

The current buffer 202 is configured to amplify control current outputted from the gate operating portion 201 to supply it to a gate of the IGBT as operating current.

As shown, the current buffer 202 can includes a NPN type first transistor Q201, a PNP type second transistor Q202, and a voltage dividing resistance R201 and R202, In the first transistor Q201, a base terminal is in connection with an on/off signal outputted from the gate operating portion 201, a collector terminal is in connection with a power source (B+), and an emitter terminal is in connection with a gate terminal of the IGBT.

In the second transistor Q202, a base terminal is in connection with an on/off signal outputted from the gate operating portion 201, an emitter terminal is in connection with a gate terminal of the IGBT, and a collector terminal is grounded.

The first transistor Q201 and the second transistor Q202 can be configured to perform a motion corresponding to an on/off signal that is outputted from the gate operating portion 201 for supply to a base terminal to turn on/off the IGBT.

The voltage dividing resistance R201 and R202 can stabilize a gate current that is outputted according to on/off of the first transistor Q201 and the second transistor Q202 to be supplied to a gate terminal of the IGBT such that the operation of the IGBT is securely sustained.

The filter resistance R205 that is disposed between the current buffer 202 can be configured to form a separate pass (line) such that a control current that is outputted from the gate operating portion 201, so as to turn off the IGBT according to a short circuit or over current of the IGBT, does not pass the current buffer 202. Accordingly, the control current outputted from the gate operating portion 201 is not amplified, such that the IGBT is smoothly turned off.

As shown, the filter resistance R205 is in connection with a base terminal and an emitter terminal of the first transistor Q201 and the second transistor Q202 of the current buffer 202.

The filter resistance R205 has a characteristic of $(I_{flt} \times R_{flt}) < VQ\_on$ and $(I_o \times R_{flt}) > VQ\_on$ wherein $I_{flt}$ is a control current for forcibly turning off the IGBT according to a short circuit or over current of the IGBT, $R_{flt}$ is resistance of the filter resistance R205, VQ_on is a minimum voltage for turning on the first transistor Q201 and the second transistor Q202 of the current buffer 202, and $I_o$ is a control current for performing turn-on and turn-off of the IGBT in a normal condition of the IGBT.

Operations of the inverter operating device according to the second exemplary embodiment of the present invention can be executed as follows.

Operations in a normal condition, in which a short circuit or over current is not detected from the IGBT, can be as follows.

The gate operating portion 201 outputs a control current ($I_o$) higher than a control current ($I_{flt}$) for turning off the IGBT so as to turn on the IGBT.

In this case, since a voltage ($I_o \times R_{flt}$) that is applied to the filter resistance R205 becomes larger than a minimum voltage (VQ_on) for turning on the first transistor Q201 and the second transistor Q202 of the current buffer 202, the current buffer 202 is normally operated. In other words, the control current (Io) that is outputted from the gate operating portion 201 is supplied to a base of the NPN type first transistor Q201 of the current buffer 202. Accordingly, the control current is amplified by a power (B+) supplied to a collector terminal according to a 'turn on' of the first transistor Q201 such that the IGBT is turned on.

In this case, the PNP type second transistor forming the current buffer 202 sustains its turned off condition.

Also, the gate operating portion 201 outputs control current ($I_o$) for turning off the IGBT.

In this case, a voltage ($I_o \times R_{flt}$) that is applied to the filter resistance R205 becomes higher than a minimum voltage (VQ_on) for turning on the first transistor Q201 and the second transistor Q202 of the current buffer 202 such that the current buffer 202 can be normally operated.

Accordingly, a control current ($I_o$) that is outputted from the gate operating portion 201 is supplied to a base of the NPN type first transistor Q201 of the current buffer 202 such that the first transistor Q201 is turned off and the PNP type second transistor Q202 is turned on.

A gate current supplied to a gate terminal of the IGBT according to a turn-on of the second transistor Q202 is grounded to a collector terminal through an emitter terminal of the second transistor Q202 such that the IGBT is turned off.

Figure 4:
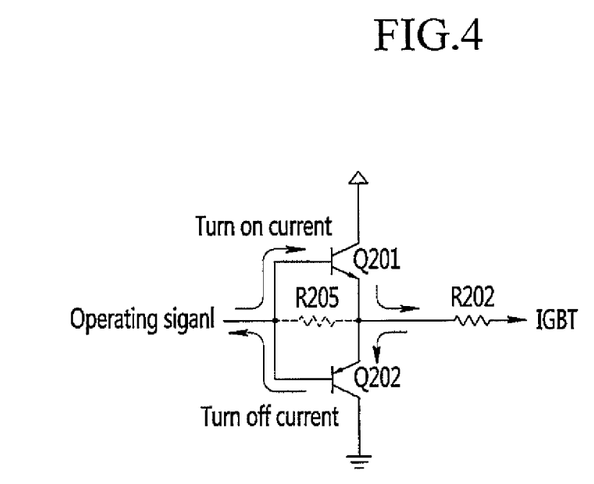
FIG. 4 shows a normal condition equivalent circuit of an inverter operating device according to the second exemplary embodiment of the present invention.

The above operation in a normal condition can be described in an equivalent circuit shown in FIG. 4.

However, in a condition that the IGBT is turned on/off according to a control current of the gate operating portion 201 as described above, if a short circuit or over current is formed in the IGBT, the operation is as follows.

If a short circuit or over current is detected from the IGBT, the gate operating portion 201 outputs a control current for turning off the IGBT so as to protect the IGBT.

At this time, the gate operating portion 201 outputs a control current ($I_{flt}$) less than a control current ($I_o$) of a normal condition to prevent formation of an excessive voltage at both ends (Vce) of the IGBT.

Accordingly, a voltage that is applied to the filter resistance R205 that is inserted between the current buffer 202 is less than a minimum voltage (VQ_on) for turning on the second transistor Q202 forming the current buffer 202.

Figure 5:
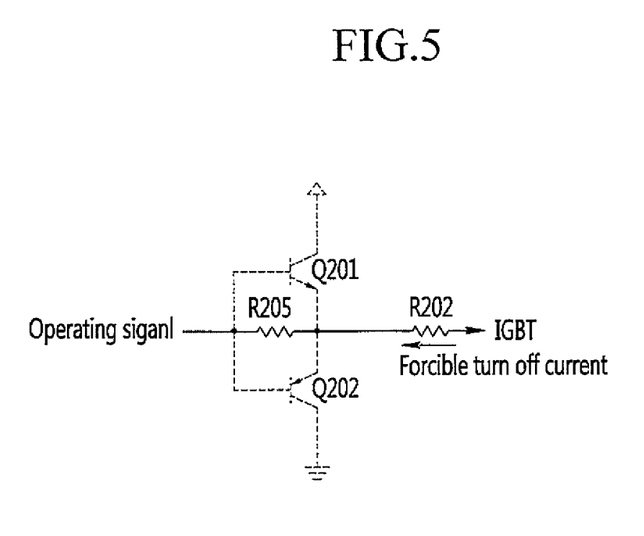
FIG. 5 shows a transient condition equivalent circuit of an inverter operating device according to the second exemplary embodiment of the present invention.

At this time, as shown in an equivalent circuit of a FIG. 5, the voltage dividing resistance R202 that is in connection with the filter resistance R205 and a gate terminal of the IGBT is coupled in series. As such, an operating current of a voltage less than a minimum voltage (VQ_on), that is outputted from the gate operating portion 201 for turning on the second transistor Q202, is transferred to a gate terminal of the IGBT. Accordingly, the IGBT is softly turned off to prevent an excessive voltage from being formed.

In the inverter operating device according to a second exemplary embodiment of the present invention as described above, if a short circuit or over current is detected in the IGBT, a different current line can be used to softly turn off the IGBT such that a response speed is not delayed in a normal switching operation and the reliability and stability of the inverter are improved.

(A Third Exemplary Embodiment)

Figure 6:
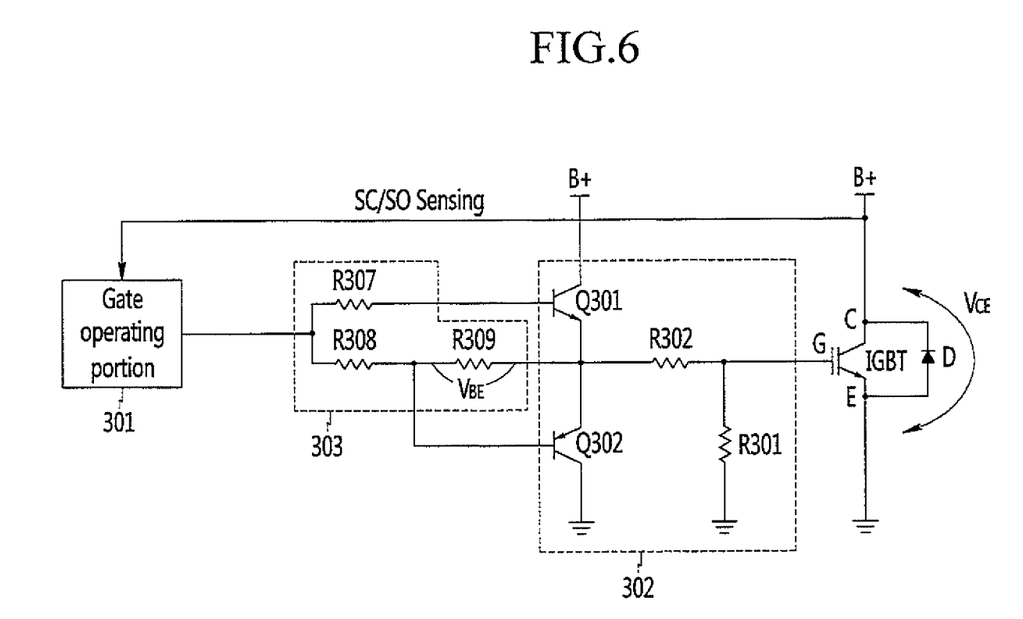
FIG. 6 shows an inverter operating device according to a third exemplary embodiment of the present invention.

FIG. 6 shows an inverter operating device according to a third exemplary embodiment of the present invention.

Referring to FIG. 6, an inverter operating device includes a gate operating portion 301, a current buffer 302, and a filter 303.

The gate operating portion 301 is configured to control turn-on/off of the IGBT, detect short circuit and over current of the IGBT, and to forcibly turn off the IGBT if the short circuit or over current is detected.

The current buffer 302 amplifies control current outputted from the gate operating portion 301 and supplies it to a gate of the IGBT as an operation current. As shown, the current buffer 302 can include a NPN type first transistor Q301, a PNP type second transistor Q302, and a voltage dividing resistance R301 and R302.

A base terminal of the first transistor Q301 is in connection with an on/off signal outputted from the gate operating portion 301, a collector terminal thereof is in connection with a power source (B+), and an emitter terminal thereof is in connection with a gate terminal of the IGBT.

A base terminal of the second transistor Q302 is in connection with an on/off signal outputted from the gate operating portion 301, an emitter terminal thereof is in connection with a gate terminal of the IGBT, and a collector terminal is grounded.

The first transistor Q301 and the second transistor Q302 are configured to perform mutually corresponding motions for an on/off signal that is outputted from the gate operating portion 301 to be transferred to a base terminal such that the IGBT is turned on/off.

The voltage dividing resistance R301 and R302 stabilize a gate voltage that is outputted according to an on/off condition of the first transistor Q301 and the second transistor Q302 to be supplied to a gate terminal of the IGBT such that the IGBT is securely operated.

The filter 303 that is disposed between the gate operating portion 201 and the current buffer 302 can be configured so as to form a different current pass, such that a control current that the gate operating portion 301 outputs to forcibly turn off the IGBT according to a short circuit or over current of the IGBT does not pass the current buffer 302.

Accordingly, a signal that is outputted by the gate operating portion 301 is not amplified by the current buffer 302 such that the IGBT is smoothly turned off.

According to this embodiment, the filter 303 includes a first resistance R307 that is in connection with a base terminal of the first transistor Q301 forming the current buffer 302, a second resistance R308 that is in connection with a base terminal of the second transistor Q302 forming the current buffer 301, and a third resistance R309 that is in connection with a part between a base terminal and an emitter terminal of the second transistor Q302.

The first resistance R307 can be configured to limit the size of control current as a gate signal supplied to a base terminal of the first transistor Q301 from the gate operating portion 301 so as to adjust a switching slope for turning on the IGBT.

The second resistance R308 can be configured to limit the size of control current that is supplied to a base terminal as a gate signal of the second transistor Q302 from the gate operating portion 301 so as to adjust a switching slope for turning off the IGBT.

The switching slope can be determined as follows.

Vce (voltage between both ends of the IGBT)/$^\Delta$t (operating time)∝1/a first and a second resistance R307 and R308

The third resistance R309, which in connection with a part between a base terminal and an emitter terminal of the second transistor Q302, can have a characteristic of $(I_{flt} \times R_{flt})$<VQ_on and $(I_o \times R_{flt})$>VQ_on wherein $I_{flt}$ is a control current for forcibly turning off the IGBT according to a short circuit or over current of the IGBT, $R_{flt}$ is a resistance of the third resistance R309, VQ_on is a minimum voltage for turning on the first transistor Q301 and the second transistor Q302 forming the current buffer 302, and $I_o$ is a control current for turning on/off the IGBT in a normal condition of the IGBT.

The present invention including the functions of the inverter operating device according to the third exemplary embodiment as described above is executed as follows.

Firstly, it is determined whether a short circuit or over current is detected, and if they are not detected, it is determined that the operation is normal, and the normal operation is as follows.

The gate operating portion 301 outputs a control current $(I_o)$ higher than a control current $(I_{flt})$ for turning off the IGBT so as to turn on the IGBT.

At this time, a voltage $(I_o \times R_{flt})$ that is applied to the third resistance R309 of the filter 303 becomes higher than a minimum voltage (VQ_on) for turning on the first transistor Q301 and the second transistor Q302 forming the current buffer 302 such that current buffer 302 can normally operate. In other words, a control current $(I_o)$ that is outputted from the gate operating portion 301 is supplied to a base of the NPN type first transistor Q301 forming the current buffer 302 to turn on the first transistor Q301.

Accordingly, the control current that is amplified by a power (B+) supplied to a collector terminal according to a 'turning on' of the first transistor Q301 is supplied to a gate terminal of the IGBT as gate current and the IGBT is turned on.

At this time, the PNP type second transistor Q302 forming the current buffer 302 sustains its 'turned off' condition, Also, the gate operating portion 301 outputs a control current $(I_o)$ for turning off the IGBT.

At this time, since a voltage $(I_o \times R_{flt})$ that is applied to the third resistance R309 is larger than a minimum voltage (VQ_on) for turning on the first transistor Q301 and the second transistor Q302 forming the current buffer 302, the current buffer 302 is normally operated.

Accordingly, a control current $(I_o)$ that is outputted from the gate operating portion 301 is supplied to a base of the NPN type first transistor Q301 forming the current buffer 302, the first transistor Q301 is turned off, and the PNP type second transistor Q302 is turned on.

Since, the gate current that is supplied to a gate terminal of the IGBT is grounded through an emitter terminal of the second transistor Q302 according to 'turning on' of the second transistor Q302, the IGBT is turned off.

The control current that is outputted from the gate operating portion 301 is supplied to a base terminal of the first transistor Q301 through the first resistance R307 of the filter 303 to turn on the first transistor Q301 and the amplified control current according to a 'turning on' of the first transistor Q301 turns on the IGBT.

Accordingly, a control current that is supplied to a base terminal of the first transistor Q301 is adjusted such that a switching operation time according to a size of the first resistance R307 is changed, and a size of the control current turning on the IGBT is controlled to adjust a slope of the 'turning on'.

Also, the control current that is outputted from the gate operating portion 301 is supplied to a base terminal of the second resistance R308 through the filter 303 to turn off the second transistor Q302, and the amplified control current according to a 'turning off' of the second transistor Q302 turns off the IGBT.

Accordingly, since a control current that is supplied to a base terminal of the second transistor Q302 according to a size of the second resistance R302 is controlled to adjust a switching operation time, a size of the control current turning off the IGBT is controlled to adjust a slope of the 'turning off'.

Figure 7:
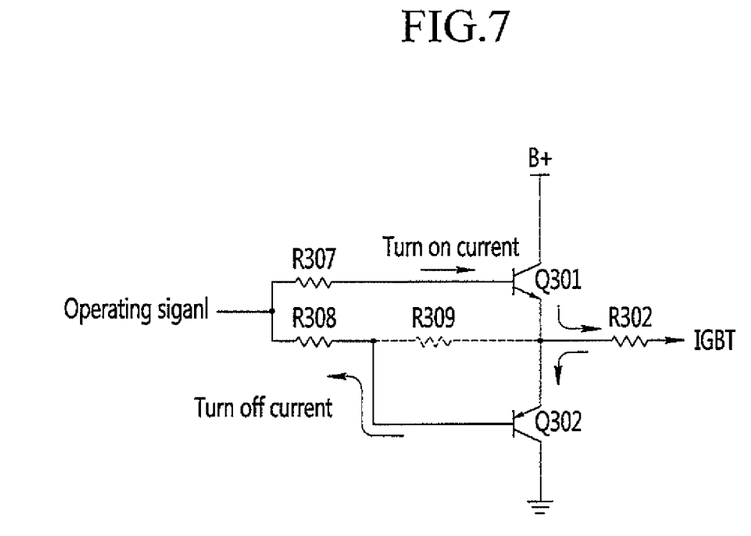
FIG. 7 shows a normal condition equivalent circuit of an inverter operating device according to the third exemplary embodiment of the present invention.

The normal condition operation of the above IGBT can be described in an equivalent circuit shown in FIG. 7.

However, if a short circuit or over current is detected from the IGBT in the above normal operation condition, it is operated as follows.

If a short circuit or over current is detected from the IGBT, the gate operating portion 201 outputs a control current for turning off the IGBT so as to protect the IGBT.

At this time, the gate operating portion 201 outputs a control current $I_{flt}$ less than a control current $(I_o)$ of a normal condition to prevent formation of an excessive voltage at both ends (Vce) of the IGBT.

Accordingly, since a voltage that is applied to the third resistance R309 (that is connected to a base terminal and an emitter terminal of the second transistor Q302 and is disposed in the filter) is less than a minimum voltage (VQ_on) for turning on the second transistor Q302 forming the current buffer 302, the second transistor Q302 sustains its turn-off condition.

Figure 8:
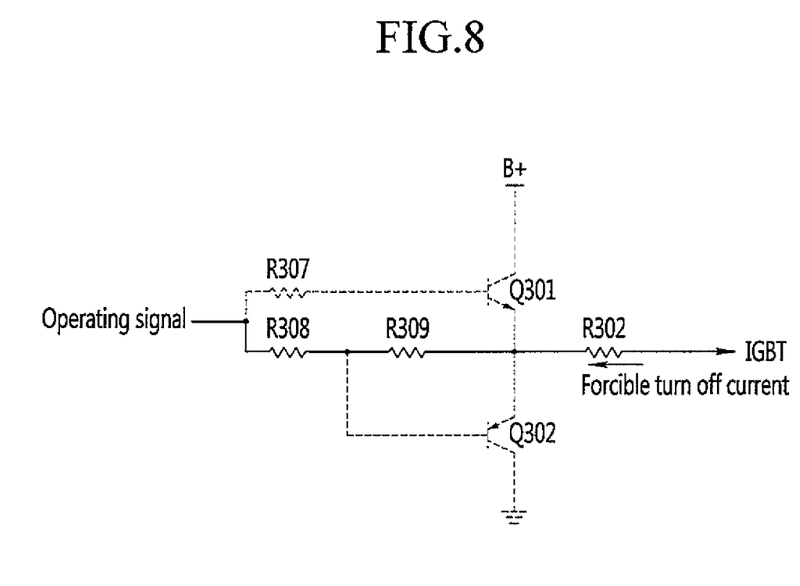
FIG. 8 shows a breakdown condition equivalent circuit of an inverter operating device according to the third exemplary embodiment of the present invention.

At this time, as shown in FIG. 8 showing an equivalent circuit in a transient condition, the second resistance R308 for adjusting a switching slope, the third resistance R309 offering a filter, and the voltage dividing resistance R302 connected to a gate terminal of the IGBT are coupled in series such that an operating current less than a minimum voltage (VQ_on) for turning on the second transistor Q302 is outputted from the gate operating portion 301 and is transferred to a gate terminal of the IGBT.

Accordingly, the IGBT is softly turned off to prevent formation of an excessive voltage.

In the inverter operating device according to the third exemplary embodiment of the present invention as described above, if a short circuit or over current is detected in the IGBT, a different current line can be used to softly turn off the IGBT such that a response speed is not delayed in a normal switching operation, and the reliability and stability of the inverter are improved.

Also, because a slope of turning on and turning off the IGBT can be adjusted, the switching loss is minimized and response time can be optimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of symbols 101,201,301: gate operating portion
102,202,302: current buffer

What is claimed is:

1. An inverter control system, comprising:
   a gate operating portion that controls turn on/off of an IGBT and forcibly turns off the IGBT, if a short circuit or an over current is detected from the IGBT;
   a current buffer configured to amplify a control current for the turn on/off of the IGBT that is outputted from the gate operating portion;
   a filter configured to delay the forcible turn off control current that is outputted from the gate operating portion.

2. The inverter control system of claim 1, wherein the current buffer comprises:
   a first transistor having a base terminal in connection with an output of the filter, a collector terminal in connection with a power source, and an emitter terminal in connection with a gate terminal of the IGBT;
   a second transistor having a base terminal in connection with an output of the filter, an emitter terminal in connection with a gate terminal of the IGBT, and a collector terminal in connection with a ground; and
   a voltage dividing resistance configured to stabilize control current amplified according to an 'on/off' condition of the first transistor and the second transistor to securely operated the IGBT.

3. The inverter control system of claim 1, wherein the filter includes an RC filter in which a capacitor and a resistance are coupled in parallel, wherein the RC filter is configured so as to not delay on/off response speed if the IGBT is normal.

4. The inverter control system of claim 1, wherein the filter delays a forcible turn-off control current of the IGBT outputted from the gate operating portion to delay a turn on time of a second transistor forming a current buffer.

5. An inverter control system, comprising:
   a gate operating portion that controls turn on/off of an IGBT and turns off the IGBT if a short circuit or over current detected from the IGBT;
   a current buffer configured to amplify turn on/off control current of the IGBT outputted from the gate operating portion;
   a filter resistance configured to form a separate line for directly supplying a forcible turn-off control current of the IGBT outputted from the gate operating portion with a gate terminal of the IGBT such that the forcible turn-off control current of the IGBT is not supplied to the current buffer.

6. The inverter control system of claim 5, wherein the filter resistance is configured such that the forcible turn-off control current outputted from the gate operating portion is not amplified in the current buffer.

7. The inverter control system of claim 5, wherein the filter resistance is in connection with a base terminal and an emitter terminal of the first transistor and the second transistor forming the current buffer.

8. The inverter control system of claim 5, wherein the filter resistance has a characteristic of $(I_{flt} \times R_{flt}) < VQ\_on$ and $(I_o \times R_{flt}) > VQ\_on$, wherein $I_{flt}$ is a forcible turn-off control current of the IGBT, $R_{flt}$ is a filter resistance value, VQ_on is a minimum voltage for turning on the first transistor and the second transistor of the current buffer, and $I_o$ is a control current for operating turn on/off of the IGBT in a normal IGBT condition.

9. The inverter control system of claim 5, wherein the gate operating portion outputs a turn on/off control current ($I_o$) higher than a forcible turn-off control current ($I_{flt}$) in a normal condition of the IGBT, such that a voltage ($I_o \times R_{flt}$) applied to the filter resistance becomes higher than a minimum voltage (VQ_on) for turning on the first transistor and the second transistor of the current buffer.

10. The inverter control system of claim 5, wherein the gate operating portion outputs a forcible turn-off control current ($I_{flt}$) of the IGBT lower than a normal control current ($I_o$) in a transient condition of the IGBT, such that a voltage ($I_o \times R_{flt}$) applied to the filter resistance becomes lower than a minimum voltage (VQ_on) for turning on the second transistor of the current buffer.

11. An inverter control system, comprising:
    a gate operating portion that controls a turn on/off of an IGBT and forcibly turns off the IGBT if a short circuit or over current is detected from the IGBT;
    a first transistor and a second transistor that are configured so as to switch according to an on/off control current outputted from the gate operating portion to amplify a control current supplied to a gate terminal of the IGBT; and
    a filter resistance in connection with a base terminal and an emitter terminal of the first transistor and the second transistor to form a separate line through which a forcible turn-off control current of the IGBT is directly transferred to a gate of the IGBT, such that a forcible turn-off control current of the IGBT cannot be supplied to a base of the first transistor and the second transistor.

12. An inverter control system, comprising:
    a gate operating portion that controls a turn on/off of an IGBT and turns off the IGBT forcibly if a short circuit or over current is detected from the IGBT;
    a first transistor and a second transistor that are configured so as to switch according to an on/off control current outputted from the gate operating portion to amplify a control current supplied to a gate terminal of the IGBT;
    a first resistance in connection with a base terminal of the first transistor to adjust a switching slope;
    a second resistance in connection with a base terminal of the second transistor to adjust a switching slope;
    a third resistance that is coupled with the second resistance in series, and is connected to a base terminal and an emitter terminal of the second transistor to form a separate line through which the forcible turn-off control current of the IGBT is direct supplied to a gate of the IGBT, such that the forcible turn-off control current of the IGBT is not supplied to a base of the second transistor.

13. The inverter control system of claim 12, wherein the third resistance has a characteristic of $(I_{flt} \times R_{flt}) < VQ\_on$ and $(I_o \times R_{flt}) > VQ\_on$ wherein $I_{flt}$ is a forcible turn-off control current of the IGBT, $R_{flt}$ is a filter resistance value, VQ_on is a minimum voltage for turning on the first transistor and the second transistor of the current buffer, and $I_o$ is a control current for turning on/off the IGBT in a normal condition of the IGBT.

14. The inverter control system of claim 12, wherein the gate operating portion outputs a turn on/off control current ($I_o$) higher than the forcible turn-off control current ($I_{flt}$) in a normal condition of the IGBT such that a voltage ($I_o \times R_{flt}$) applied to the third resistance becomes higher than a minimum voltage (VQ_on) for turning on the first transistor and the second transistor of the current buffer.

15. The inverter control system of claim 12, wherein the gate operating portion outputs a forcible turn-off control current for the IGBT ($I_{flt}$) lower than a normal control current ($I_o$) in a transient condition of the IGBT such that a voltage ($I_o \times R_{flt}$) applied to the third resistance becomes lower than a minimum voltage (VQ_on) for turning on the second transistor of the current buffer.

* * * * *